(12) United States Patent
Bouldin et al.

(10) Patent No.: US 7,311,504 B2
(45) Date of Patent: Dec. 25, 2007

(54) APPARATUS FOR AND METHOD OF TRANSFORMING USEFUL MATERIAL INTO MOLDED OR EXTRUDED ARTICLES

(75) Inventors: Floyd E. Bouldin, McMinnville, TN (US); Thomas E. Cantrell, McMinnville, TN (US)

(73) Assignee: Bouldin Corporation, McMinnville, TN (US)

( * ) Notice: Subject to any disclaimer, the term of this patent is extended or adjusted under 35 U.S.C. 154(b) by 114 days.

(21) Appl. No.: 10/232,425

(22) Filed: Aug. 30, 2002

(65) Prior Publication Data

US 2004/0043097 A1    Mar. 4, 2004

(51) Int. Cl.
*B29C 47/54* (2006.01)
(52) U.S. Cl. .................. 425/62; 425/256; 425/350; 425/376.1; 425/411; 100/276
(58) Field of Classification Search .................. 425/62, 425/256, 350, 411, 367.1; 100/215, 218, 100/269.01, 269.2, 276, 269.1
See application file for complete search history.

(56) References Cited

U.S. PATENT DOCUMENTS

| | | | | |
|---|---|---|---|---|
| 1,490,162 A | * | 4/1924 | Dow | 425/156 |
| 2,780,987 A | * | 2/1957 | Wall | 100/249 |
| 3,564,993 A | * | 2/1971 | Tezuka et al. | 100/269.01 |
| 3,858,504 A | * | 1/1975 | Boyer | 100/215 |
| 4,099,457 A | * | 7/1978 | Hyden | 100/215 |
| 4,153,404 A | * | 5/1979 | Ottman | 425/352 |
| 4,569,649 A | * | 2/1986 | Gross | 425/432 |
| 4,590,000 A | * | 5/1986 | Baatz et al. | 100/249 |
| 4,729,304 A | * | 3/1988 | Gardella et al. | 100/218 |
| 5,347,921 A | * | 9/1994 | Gourdol | 100/98 R |
| 5,363,758 A | * | 11/1994 | Wildes et al. | 100/215 |
| 6,234,780 B1 | * | 5/2001 | Liu et al. | 425/256 |
| 6,397,492 B1 | | 6/2002 | Malley | |

* cited by examiner

*Primary Examiner*—Yogendra N. Gupta
*Assistant Examiner*—Thu Khanh T. Nguyen
(74) *Attorney, Agent, or Firm*—Waddey & Patterson, P.C.; Phillip E. Walker

(57) ABSTRACT

A material handling exit section in the nature of a material extruder and mold combination for shaping the material exiting a hydrolyzer, comprising an extrusion chamber and a plunger assembly attached to the extrusion chamber and further including a working cylinder having a cylinder shaft and a ram operably connected to the shaft enabling the ram to move the material within the extrusion chamber upon actuation of the cylinder and the extension of the shaft therefrom.

17 Claims, 5 Drawing Sheets

APPARATUS FOR AND METHOD OF TRANSFORMING USEFUL MATERIAL INTO MOLDED OR EXTRUDED ARTICLES

BACKGROUND OF THE INVENTION

1. Field of the Invention

The present invention relates generally to municipal solid waste disposal, reclamation and recycling. Municipal solid waste (hereinafter "solid waste") disposal can be generally defined as the disposal of normally solid or semi-solid materials resulting from human and animal activities that are useless or unwanted, and not hazardous or toxic.

Solid wastes may be further classified in two groups as follows: "garbage" which is decomposable wastes from food, and "rubbish" which is either combustible wastes (such as paper, wood, and cloth) or non-combustible wastes (such as metal, glass, plastics and ceramics).

The present invention is primarily directed to a system and apparatus for reducing and converting (hereinafter "processing") of solid waste comprised of garbage and rubbish produced in the home (hereinafter "Municipal Solid Waste" or "MSW") and the equipment for carrying out such processing into a reusable end product or article.

2. Description of the Related Art

Historically, a municipality's chosen method of disposing of its municipal solid waste depended almost entirely on costs, and more recently environmental conditions, both of which are likely to reflect the local circumstances. Composting of solid wastes accounts for only an insignificant fraction of the solid waste stream.

By far the most common method of solid waste disposal in the United States is the deposition of such wastes on land or in "landfills". Landfills are believed to account for more than ninety percent of the nation's municipal refuse and incineration accounts for most of the remainder. Until now, a sanitary landfill was considered the cheapest most satisfactory means of disposal by most municipalities, but only if suitable land is within an "economic range" of the source of the wastes (i.e., geographic proximity making waste removal and hauling economically feasible). Collection and transportation costs are known to account for seventy-five percent of the total cost of solid waste disposal and management.

In modern landfills the refuse is spread in thin layers, each of which is compacted by heavy industrial equipment before the next layer is spread. When about ten feet of refuse has been deposited, it is covered by a thin layer of clean earth which also is compacted. Pollution of surface and groundwater is believed to be minimized by lining and contouring the fill, compacting and planting the cover, selecting proper soil, diverting upland drainage, and placing wastes in sites not subject to flooding or high groundwater levels. Landfills are known to generate flammable gases through the anaerobic decomposition of the organic solid waste and thus proper venting and burning of the gases, usually methane, is often necessary to eliminate or alleviate potentially dangerous conditions.

The second most popular method of solid waste disposal is incineration. Incinerators of conventional design burn refuse on moving grates in refractory-lined chambers. The combustible gases and the solids they carry are burned in secondary chambers. Combustion is eighty-five to ninety percent complete for the combustible materials. In addition to heat, the products of incineration include the normal primary products of combustion including carbon dioxide and water, as well as oxides of sulfur and nitrogen and other gaseous pollutants. The nongaseous products are fly ash and unburned solid residue. Emissions of fly ash and other particles are often controlled by wet scrubbers, electrostatic precipitators, and bag filters positioned inside or adjacent the exhaust stacks.

On the downside, landfill and incineration methods of disposal have been known to pose significant environmental problems and the associated health concerns by the municipalities, government, private industry, and individuals are increasing. Therefore, a growing trend associated with the treatment and handling of solid waste material is "resource recovery". Resource recovery is intended to recover useful materials from raw municipal solid waste and the handling may include grinding or shredding machines, magnetic separators, air classification that separates the light and heavy fractions, screening, and/or washing. Resource recovery methods, therefore, attempt to reduce (i.e., recycle) the solid waste into a more manageable, although not always useful, form, but such methods are quite costly.

In all known methods of solid waste disposal (e.g., reduction, treatment or resource recovery), the resultant end product may further include microbes or microorganisms that require careful consideration and handling prior to disposal. In such cases the by-products are believed to remain waste materials not suitable for use or transformation into useful articles.

The present invention relates generally to municipal solid waste handling and disposal, but is actually believed to be the most desirable solution to the growing waste problem because the cost effective and resource recovery methods used, as well as the physical characteristics of the processed material end product.

The art to which the invention relates includes and is believed to be limited to the information of the type disclosed in U.S. Pat. No. 6,017,475 granted to Cantrell which is incorporated by reference as if fully set forth herein. The '475 patent is directed to a process of transforming household garbage into useful materials.

SUMMARY OF THE INVENTION

The preferred embodiment of the present invention can be summarized as follows: a material handling apparatus in the nature of a material extruder or mold combination for shaping the material exiting a hydrolyzer, the apparatus comprising an extrusion chamber, and a plunger assembly attached to the extrusion chamber and further including a working cylinder having a cylinder shaft and a ram operably connected to the shaft enabling the ram to move the material within the extrusion chamber upon actuation of the cylinder and the extension of the shaft therefrom.

A plurality of annular fins are preferably secured to the exterior surface of the extrusion chamber. The preferred material handling section also includes a block extruding section and block molding section. The molding and/or extruding are accomplished by a pneumatic or hydraulic cylinder attached at one end to a truss cross-member and the other to a stop plate.

The block extruding section preferably includes an aperture gate for reciprocally blocking an aperture configured to correspond with the interior dimension of the extrusion chamber and be reciprocally positioned therewith. An aperture gate is interpositioned between the extrusion chamber and a block extruding section for extruding blocks of processed material. A stop plate and an extrusion cylinder opposing the working cylinder of the plunger assembly assists with the formation of the block, and the working cylinder and the extrusion cylinder are axially aligned to oppose one another. The working cylinder preferably exerts a greater force than the extrusion cylinder.

The preferred embodiment of the material handling apparatus of the claimed invention includes a wheeled carriage enabling the aperture gate and the block extruding section to be supported and mobile.

The present invention may also be summarized as follows: a material handling exit section in the nature of a material extruder or mold combination for shaping the material exiting a hydrolyzer, the apparatus comprising an extrusion chamber, and a plunger assembly attached to the extrusion chamber and further including a working cylinder having a cylinder shaft and a ram operably connected to the shaft enabling the ram to move the material within the extrusion chamber upon actuation of the cylinder and the extension of the shaft therefrom.

DETAILED DESCRIPTION OF THE PREFERRED EMBODIMENT(S)

Figure 1:
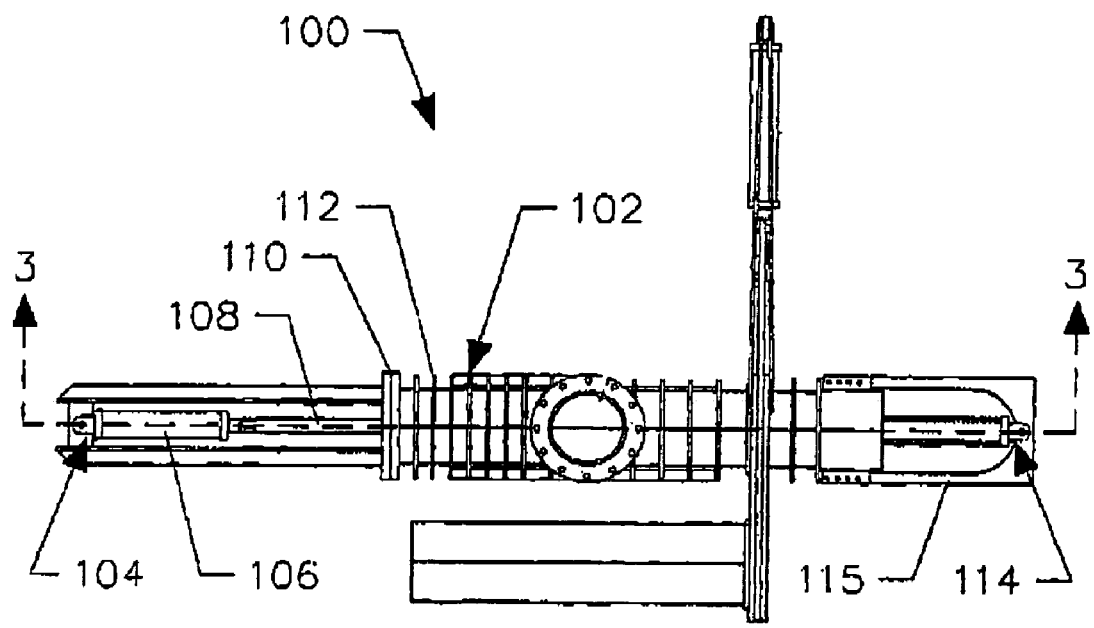
FIG. 1 is a top view of the material handling exit section of the present invention with the optional extrusion shuttle mechanism shown in a first position and the optional expansion chamber.

The preferred embodiment of the material handling apparatus 100 includes an extrusion chamber or mold 102 which receives the processed material or FLUFF (trademark of Bouldin Corporation, McMinnville, Tenn.) exiting a hydrolyzer (not shown) and compresses it via the plunger assembly 104. Plunger assembly 104 further includes a pneumatic or hydraulic cylinder 106 having a shaft 108 attached to a ram 109. The plunger assembly 104 is securely attached to the extrusion chamber 102 by a mating cooperating collar assembly 110. Circumferential fins 112 provide structural support for the extrusion chamber 102 to resist bending and maintain the alignment with the ram 109 which reciprocates therein.

Figure 2:
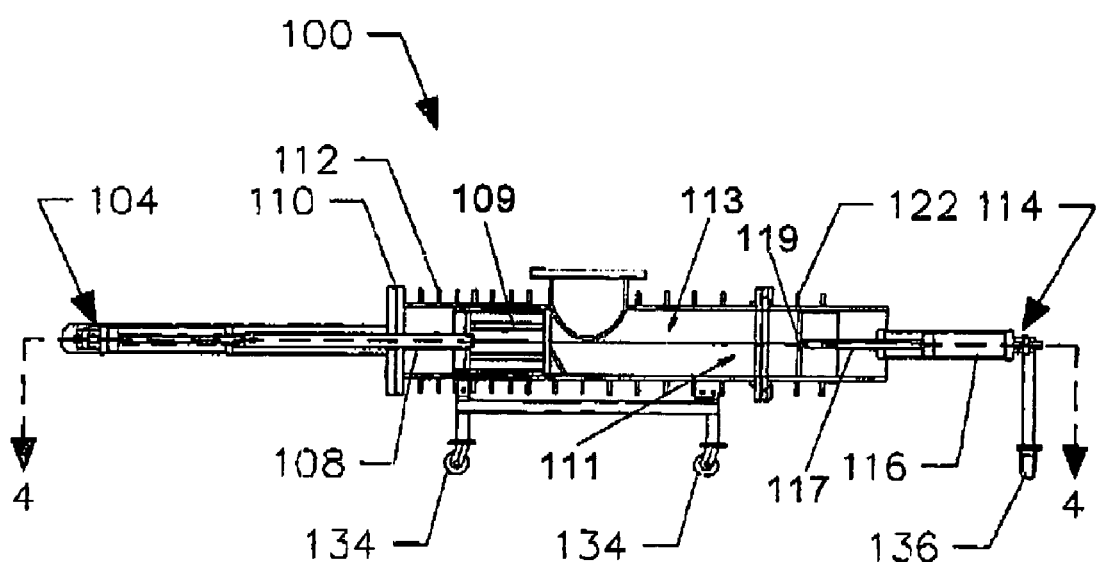
FIG. 2 is a side partial cutaway side view of the embodiment shown in FIG. 1.
Figure 3A:
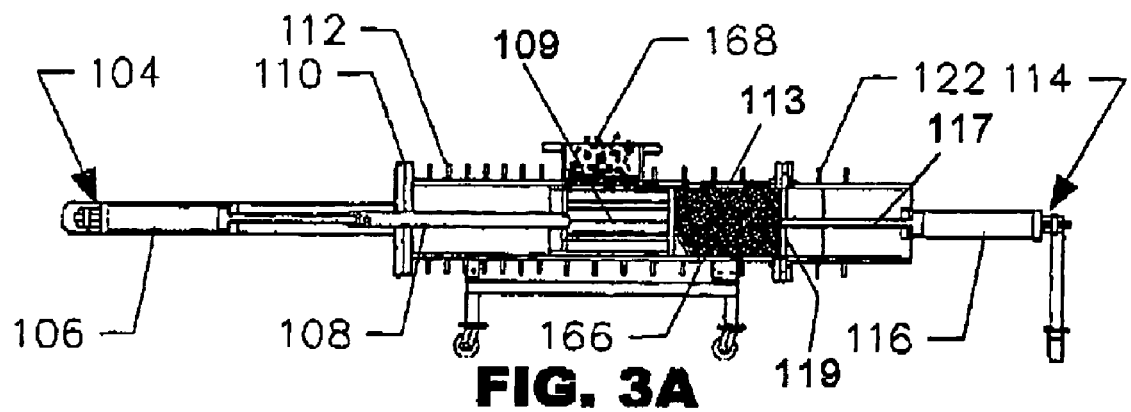
FIGS. 3A-3H are partially cutaway side view of the present invention as shown in FIGS. 1 and 2.
Figure 3B:
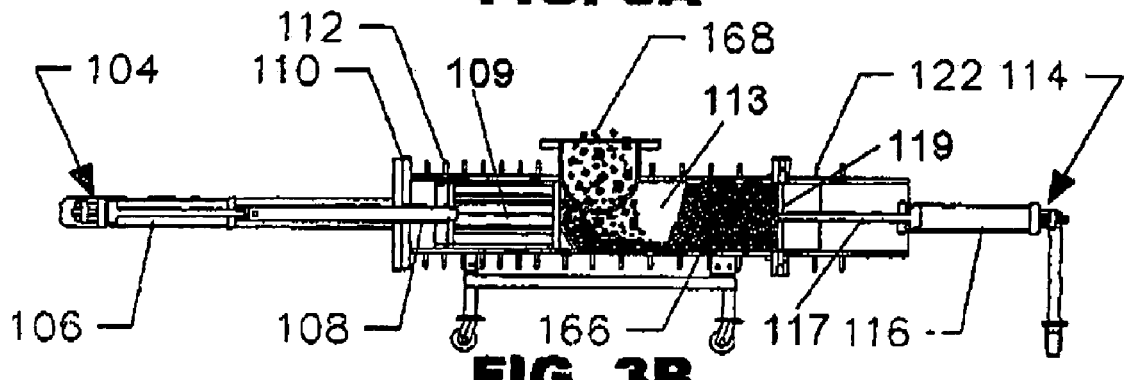
Figure 3C:
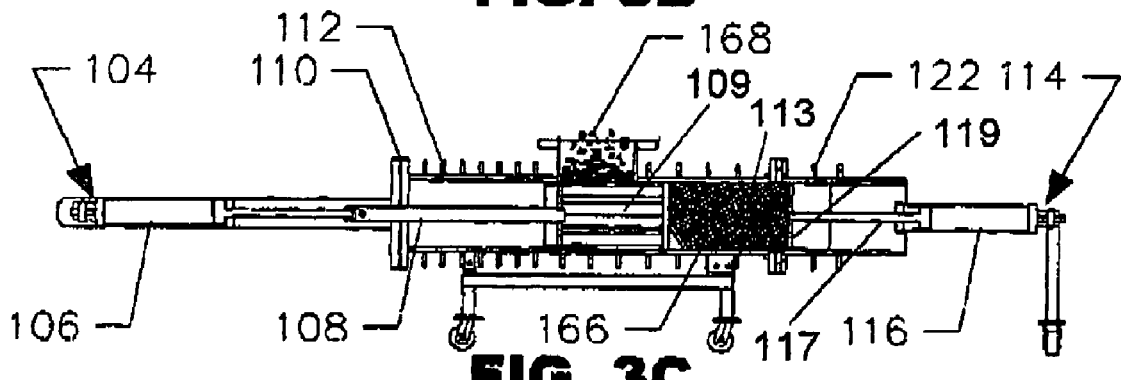
Figure 3D:
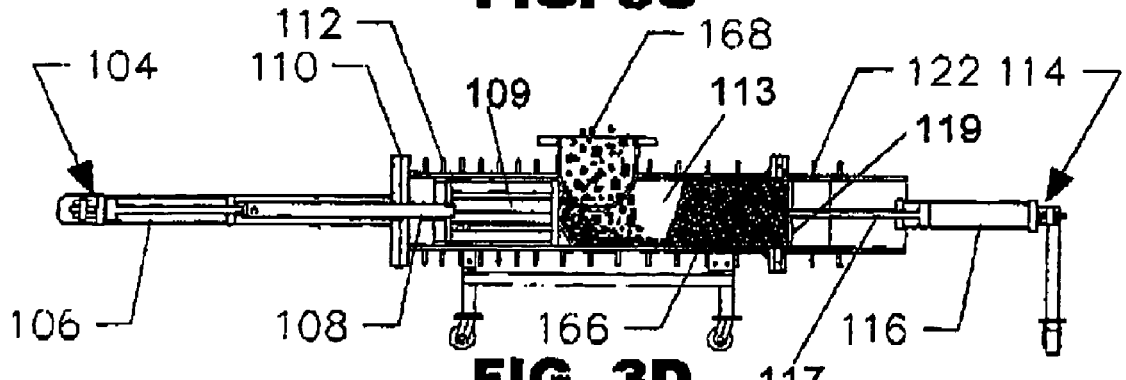
Figure 3E:
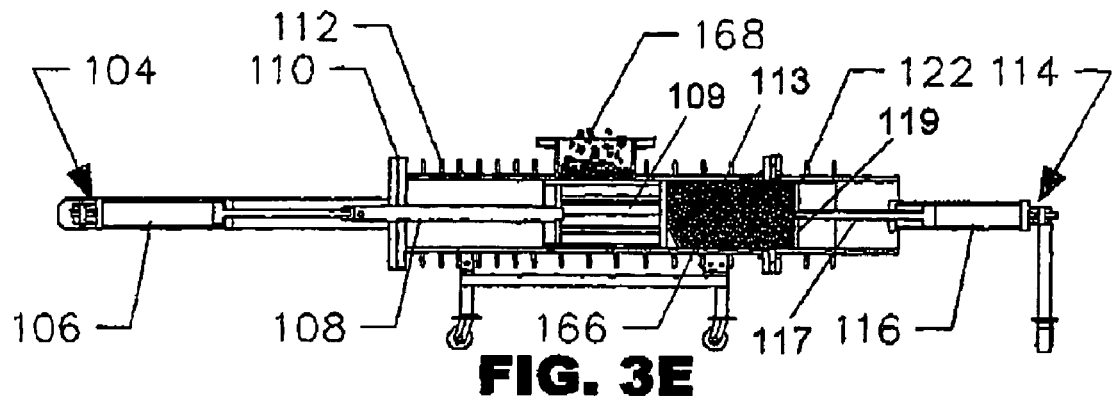
Figure 3F:
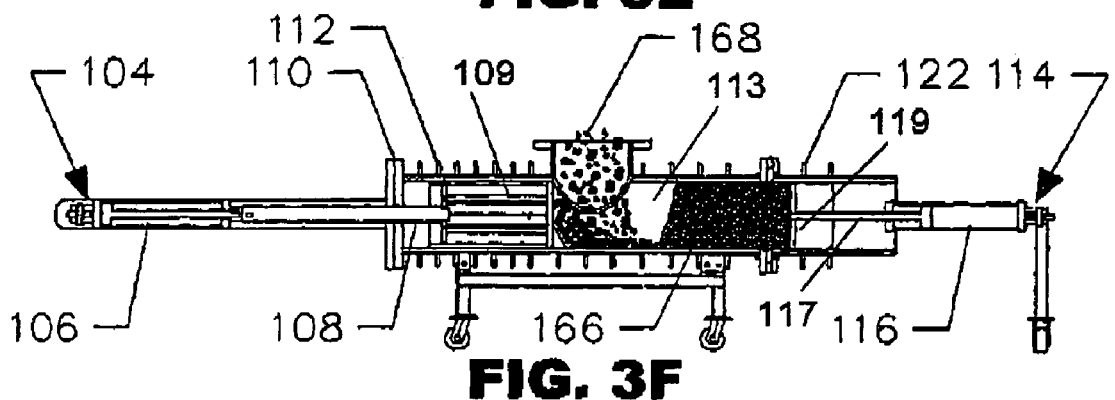
Figure 3G:
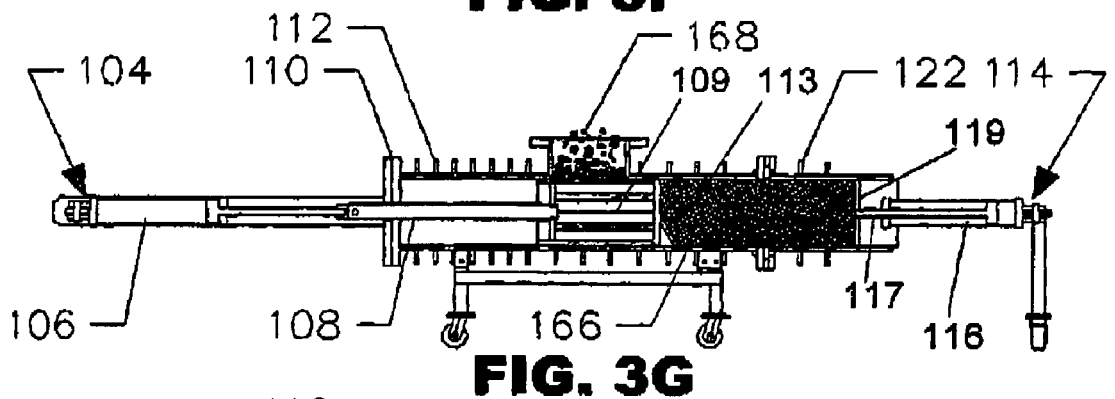
Figure 3H:
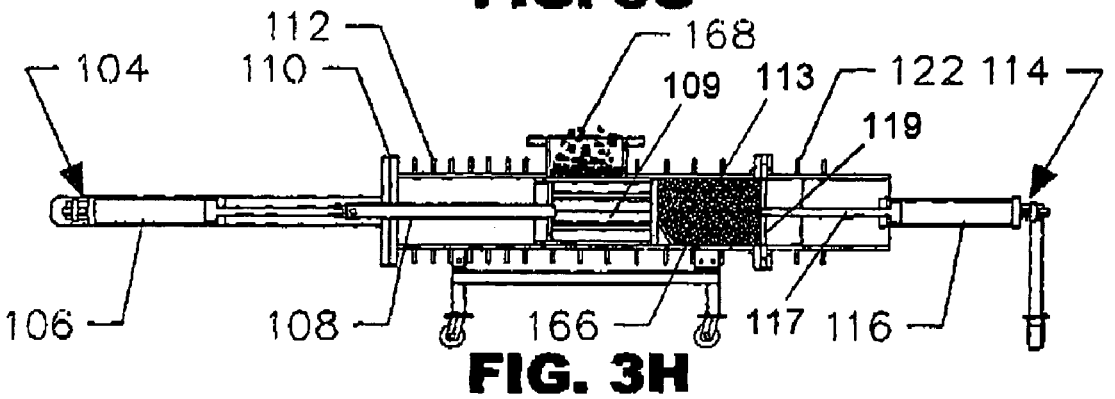
Figure 4A:
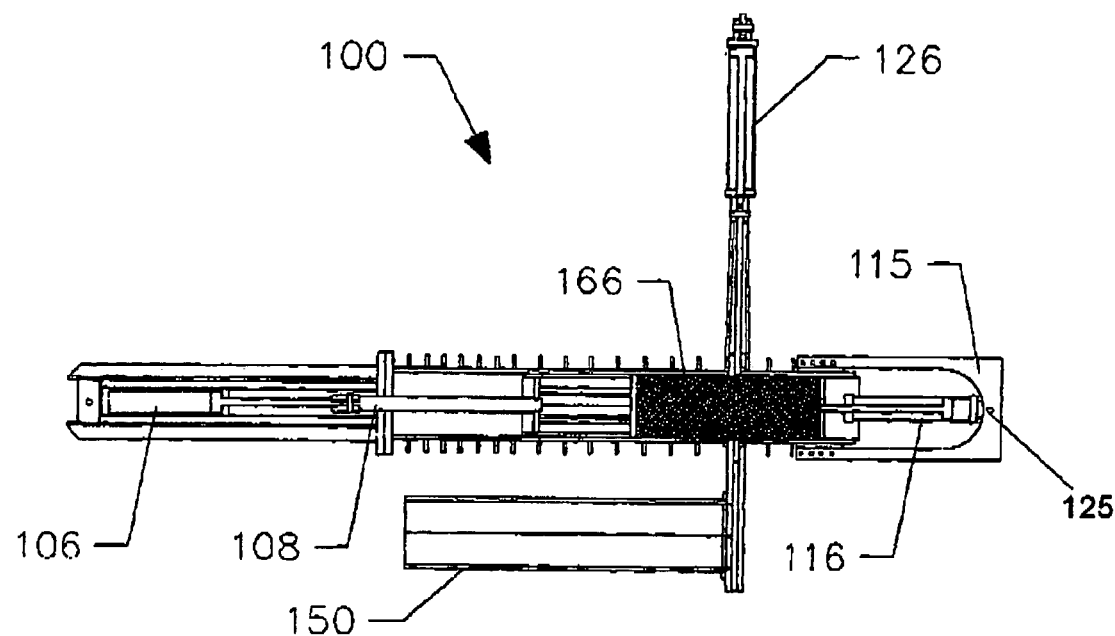
FIGS. 4A-4D are partially cutaway top views of the material handling exit section shown in FIGS. 3G and 3H.
Figure 4B:
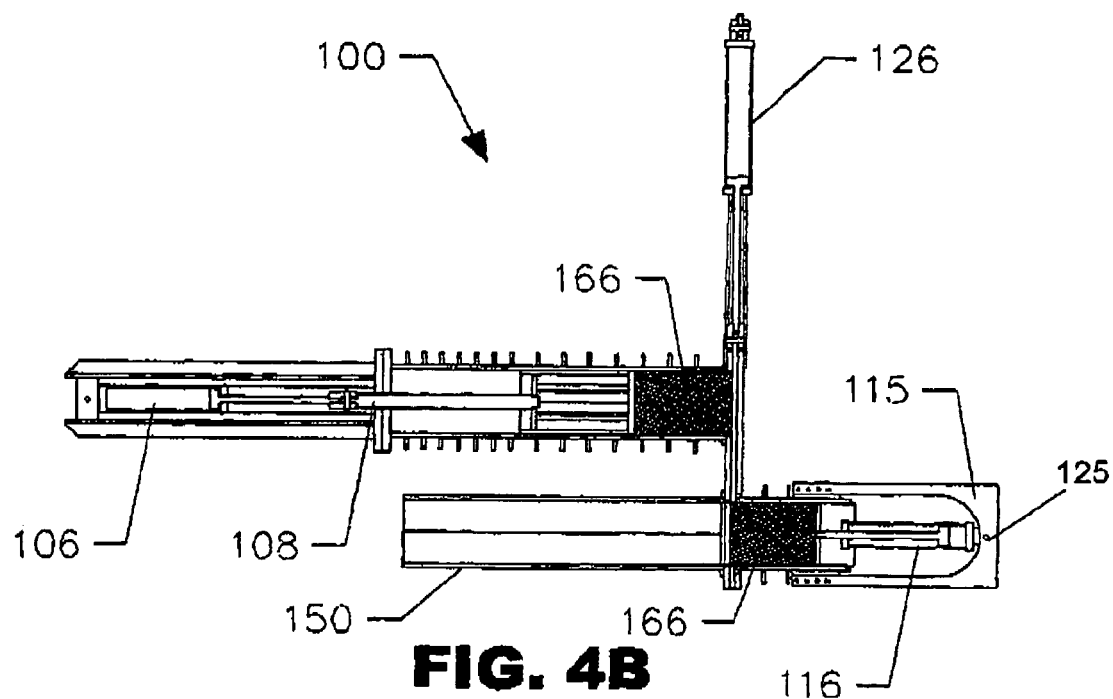
Figure 4C:
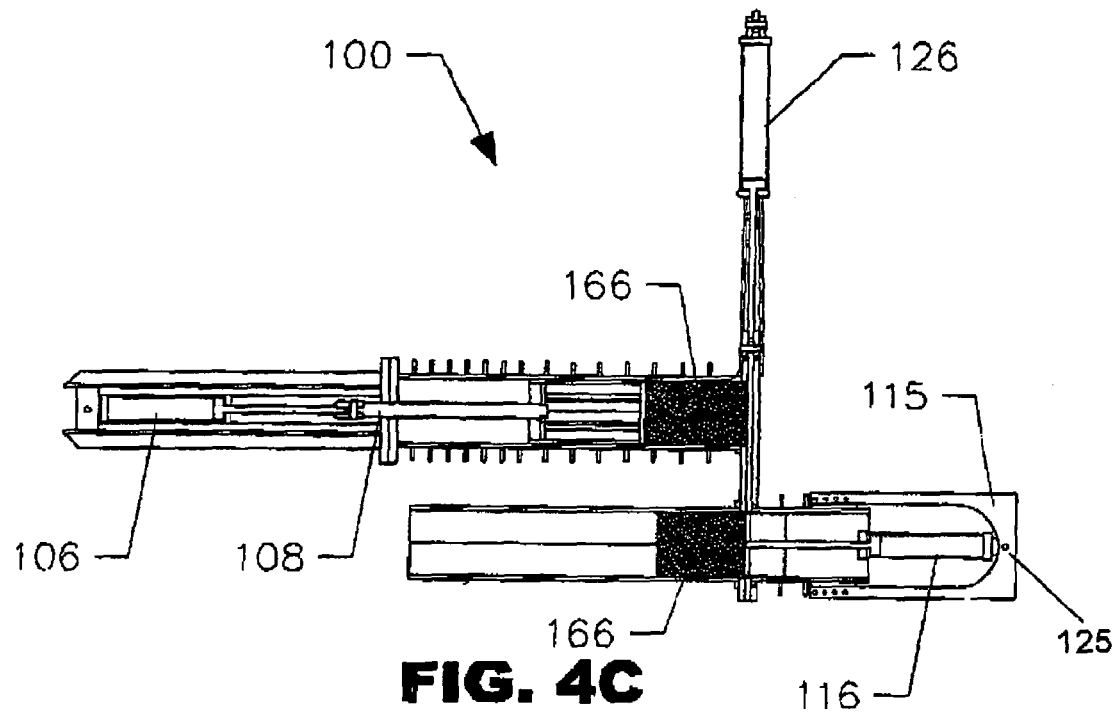
Figure 4D:
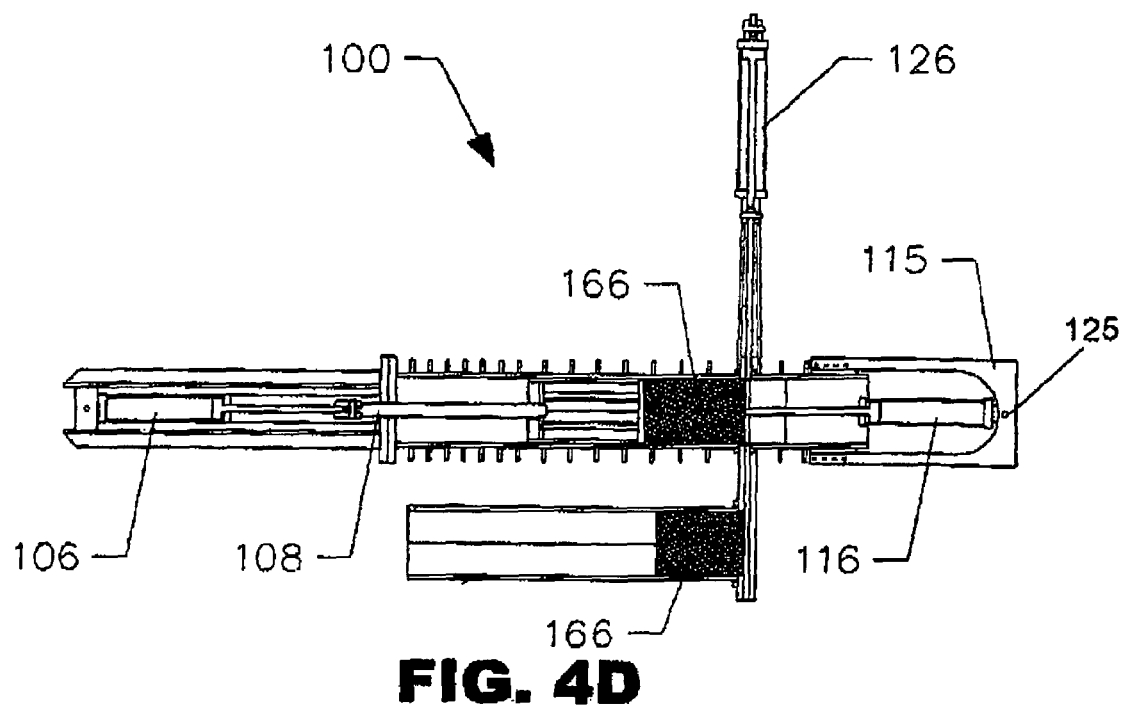

The force of the ram 109 on the material is sufficient to produce a compressed mass of material 166 prior to being extruded through an orifice 111 (FIG. 2) at the mating intersection of the extrusion chamber 102 and the block extruding section 122. Extrusion assembly 114 (FIGS. 3A-3H and 4A-4D) consists of a truss 115 and includes a pneumatic or hydraulic cylinder 116 attached at one end of the truss 115 at a cross-member 125 (See FIGS. 4A-4D).

Cylinder shaft 117 terminates in a stop plate 119 which serves as the backstop of the ram 109 enabling the material interpositioned between the ram 109 and stop plate 119 to form a compressed mass having the exterior dimension resembling the interior 113 of the extrusion chamber 102 and block extruding section 122 (FIGS. 2 and 3A-3H) during use.

Wheeled carriage assemblies 134 and 136 (FIG. 2) enable the material handling apparatus 100 to be supported and mobile as the aperture gate 130 cuts through the compacted material to form individual extruded blocks thereof.

Mode of Operation.

With reference to FIGS. 3A-3H and 4A-4D, after a sufficient amount of material 168 is released from the hydrolyzer (not shown) and input into the FLUFF material handling apparatus 100, the ram 109 forces the FLUFF material through the chamber 102 and compresses the FLUFF material into a block 166 within the block extruding section 122 as described above.

The extrusion through the chamber 102 and past orifice 111 (FIG. 2) enables the continuous compaction of the FLUFF material until such time as the force of the extruded material block onto the stop plate 119 overcomes the force of the cylinder 116 to indicate the user selected compression is completed.

What is claimed is:

1. A material handling apparatus in the nature of a material extruder or mold combination for shaping the material exiting a hydrolyzer, the apparatus comprising:
   an extrusion chamber;
   a plunger assembly attached to the extrusion chamber and further including;
      a working cylinder having a cylinder shaft and positioned to exert a working shaft force on the material; and
      a ram operably connected to the shaft enabling the ram to move the material within the extrusion chamber upon actuation of the cylinder and the extension of the shaft therefrom;
   an extrusion assembly slideably engaging the extrusion chamber and including:
      a block extruding section in fluid communication with the extrusion chamber and aligned to enable the ram to move the material within the block extruding section;
      an extrusion cylinder attached to the block extruding section and positioned to exert an extrusion cylinder force on the material; and
      a stop plate positioned to reciprocate within and traverse a majority of the block extruding section and operably connected to the extrusion cylinder, the stop plate serving as a backstop of the ram of the plunger assembly such that material interpositioned between the ram and the stop plate is compressed;
   wherein the working shaft is positioned to exert the working shaft force through the ram and the material to the stop plate and extrusion cylinder; and
   wherein compression is completed when the working shaft force transferred through the material to the stop plate overcomes the extrusion cylinder force.

2. The material handling apparatus of claim 1, further comprising:
   a plurality of annular fins secured to the exterior surface of the extrusion chamber.

3. The material handling apparatus of claim 1, wherein the extrusion cylinder is selected from the group consisting of hydraulic and pneumatic cylinders.

4. The material handling apparatus of claim 1, wherein:
   the extrusion cylinder of the extrusion assembly is attached at one end to a truss cross-member and the other to the stop plate.

5. The material handling apparatus of claim 1, further comprising:
   an aperture gate for reciprocally blocking an aperture configured to correspond with the interior dimension of the extrusion chamber and be reciprocally positioned therewith.

6. The material handling apparatus of claim 1, wherein the extrusion cylinder attached to the stop plate opposes the working cylinder of the plunger assembly.

7. The material handling apparatus of claim 1, further comprising:
an aperture gate interpositioned between the extrusion chamber and the block extruding section, the block extruding section slideably attached to the extrusion chamber and positionable between a position co-linear with the axis of the extrusion chamber and a position parallel with the axis of the extrusion chamber for extruding blocks of processed material.

8. The material handling apparatus of claim 7, further comprising:
a wheeled carriage enabling the aperture gate and the block extruding section to be supported and mobile.

9. The material handling apparatus of claim 6, wherein: the working cylinder and the extrusion cylinder of the extrusion assembly are axially aligned to oppose one another in a first position and are axially offset to be parallel to one another in a second position.

10. The material handling apparatus of claim 9, wherein: the working cylinder exerts greater force than the extrusion cylinder.

11. An apparatus for continuously compacting material comprising:
a compaction chamber;
a plunger received by the compaction chamber and providing a plunger force against the material in the chamber;
a block extruding section in fluid communication with to the compaction chamber and aligned to enable the plunger to move the material within the block extruding section, the block extruding section slideably attached to the extrusion chamber and positionable between a position co-linear with the axis of the extrusion chamber and a position parallel with the axis of the extrusion chamber; and
a stop plate received in the compaction chamber and the block extruding section, the stop plate controlled by a stop plate force, wherein the stop plate is positioned to traverse the block extruding section when the plunger force exceeds the stop plate force.

12. The apparatus of claim 11 further comprising a plunger cylinder for providing the plunger force and advancing the plunger.

13. The apparatus of claim 11 further comprising a stop plate cylinder for providing the stop plate force.

14. The apparatus of claim 11 wherein the stop plate force is sufficient to compact the material.

15. A material handling apparatus in the nature of a material extruder or mold combination for shaping the material exiting a hydrolyzer, the apparatus comprising:
an extrusion chamber;
a plunger assembly attached to the extrusion chamber and further including:
a working cylinder having a cylinder shaft and positioned to exert a working shaft force on the material; and
a ram operably connected to the shaft enabling the ram to move the material within the extrusion chamber upon actuation of the cylinder and the extension of the shaft therefrom;
an extrusion assembly slideably engaging the extrusion chamber and including:
a block extruding section in fluid communication with the extrusion chamber and aligned to enable the ram to move the material within the block extruding section;
an extrusion cylinder attached to the block extruding section and positioned to exert an extrusion cylinder force on the material;
a stop plate positioned to reciprocate and traverse within the block extruding section and operably connected to the extrusion cylinder, the stop plate serving as a backstop of the ram of the plunger assembly such that material interpositioned between the ram and the stop plate is compressed; and
an aperture gate for reciprocally blocking an aperture defined between the block extruding section and the extrusion chamber, the aperture gate configured to correspond with the interior dimension of the extrusion chamber and be reciprocally positioned therewith; and
wherein the block extruding section is slideably attached to the extrusion chamber and positionable between a first position co-linear with the axis of the extrusion chamber and a second position parallel with the axis of the extrusion chamber for extruding blocks of processed material.

16. The material handling apparatus of claim 15, wherein the working shaft is positioned to exert the working shaft force through the ram and the material to the stop plate and extrusion cylinder.

17. The material handling apparatus of claim 15, wherein compression is completed when the working shaft force transferred through the material to the stop plate overcomes the extrusion cylinder force.

* * * * *